US012811525B2

(12) United States Patent
Dee

(10) Patent No.: US 12,811,525 B2
(45) Date of Patent: Nov. 24, 2026

(54) CONTROL UNIT IN AN ACTIVE INCEPTOR

(71) Applicant: BAE SYSTEMS PLC, London (GB)

(72) Inventor: Justin Mark Dee, Rochester (GB)

(73) Assignee: BAE SYSTEMS PLC, London (GB)

( * ) Notice: Subject to any disclaimer, the term of this patent is extended or adjusted under 35 U.S.C. 154(b) by 179 days.

(21) Appl. No.: 18/860,161

(22) PCT Filed: Apr. 20, 2023

(86) PCT No.: PCT/GB2023/051033
§ 371 (c)(1),
(2) Date: Oct. 25, 2024

(87) PCT Pub. No.: WO2023/209335
PCT Pub. Date: Nov. 2, 2023

(65) Prior Publication Data

US 2025/0293626 A1 Sep. 18, 2025

(30) Foreign Application Priority Data

Apr. 29, 2022 (EP) .................................... 22275058
Apr. 29, 2022 (GB) ..................................... 2206340

(51) Int. Cl.
*B64C 13/10* (2006.01)
*H02P 23/00* (2016.01)
*H02P 29/60* (2016.01)

(52) U.S. Cl.
CPC .............. *H02P 23/00* (2013.01); *H02P 29/60* (2016.02)

(58) Field of Classification Search
CPC ..... B64C 13/10; B64C 13/505; B64C 13/507; B64C 13/12; B64C 13/0421; H02P 29/60; H02P 23/00
USPC .............................................................. 318/3
See application file for complete search history.

(56) References Cited

U.S. PATENT DOCUMENTS 11,196,585 B1 * 12/2021 Auerbach ......... H04L 12/40013
2008/0156939 A1 * 7/2008 Hanlon ................. B64C 13/507 244/223
2009/0266939 A1 * 10/2009 Hanlon .................. B64C 13/46 244/223
2012/0056039 A1 3/2012 Stiefenhofer et al.
(Continued)

FOREIGN PATENT DOCUMENTS

GB 2482407 A 2/2012
WO 2023209335 A1 11/2023

OTHER PUBLICATIONS

Extended European Search Report received for EP Application No. 22275058.0, dated Oct. 6, 2022. 8 pages.
(Continued)

*Primary Examiner* — Gabriel Agared
(74) *Attorney, Agent, or Firm* — Arcane Law PLLC

(57) ABSTRACT

According to an aspect of the present invention, there is provided a control unit in an active inceptor configurable to generate force feedback in a linked active inceptor system, comprising: a first connection configured when an operation is performed to drive a motor and in response thereto the motor to generate an associated force feedback at the active inceptor; and a second connection configured when the operation is performed to drive a remote motor in a remote active inceptor and in response thereto the remote motor to generate the associated feedback at the remote active inceptor.

24 Claims, 5 Drawing Sheets

(56) References Cited

U.S. PATENT DOCUMENTS

| | | | | |
|---|---|---|---|---|
| 2015/0191241 | A1 | 7/2015 | Antraygue | |
| 2018/0362147 | A1* | 12/2018 | Huynh | B64C 13/16 |
| 2022/0266983 | A1* | 8/2022 | Starr | B64C 13/0421 |

OTHER PUBLICATIONS

GB Combined Search and Examination Report under Sections 17 and 18(3) received for GB Application No. 2206340.8, dated Oct. 24, 2022. 6 pages.

International Search Report and Written Opinion received for PCT Application No. PCT/GB2023/051033. Mail date: Jun. 15, 2023. 11 pages.

* cited by examiner

CONTROL UNIT IN AN ACTIVE INCEPTOR

FIELD

The present invention relates to a control unit in an active inceptor configurable to generate force feedback in a linked active inceptor system.

BACKGROUND

Active inceptors are electronic devices used in control systems to receive operator inputs. Active inceptors provide force feedback to the operator. This force feedback provides the operator with tactile information or warnings from the control system.

Some control systems comprise more than one active inceptor. In such systems it can be desirable to communicate an operation made at one active inceptor to a second linked active inceptor by replicating the operation or otherwise. An example scenario being a pilot and a co-pilot in a cockpit operating a pair of linked flight stick active inceptors. When a pulling or other motion is applied to a first flight stick active inceptor, the motion is replicated at the linked flight stick active inceptor as force feedback. Historically this was accomplished with mechanical linkages between controllers, but active inceptors provide an electronic alternative with advantages in efficiency and weight reduction. Typically, the force feedback is provided by a motor within the active inceptor.

Different control systems receive various possible operations as inputs. Active inceptors are therefore designed to receive input and provide feedback in a varying number of mechanical axes. Single axis inceptors receive input in a single mechanical axis and provide force feedback in that same axis. Dual axis inceptors receive input in two mechanical axes and providing force feedback in both. A separate motor is typically required to provide the force feedback for each axis. Thus, in a dual axis inceptor two motors may be required whereas single axis inceptors may require only one. Accordingly, dual axis inceptors typically require more complexity and power than single axis inceptors.

Current implementations of single axis inceptors repurpose the architecture used in dual axis inceptors which has led to inefficiency. FIG. 1 shows a known architecture for a linked single-axis active inceptor system 100. The architecture uses the same control components as a dual axis inceptor system. The system consists of a single axis inceptor 102 connected through a bus connection 126 to a remote single axis inceptor 128 of the same configuration. A control unit 106, a second control unit 108, a first connection 110, a second connection 112, a third connection 114, and a fourth connection 116, a gearing system 120, and a single mechanical axis 122.

The control unit 106 and second control unit 108 are each configured with two connections. Each control unit being capable of driving a separate motor at each connection about a separate mechanical axis. The control unit 106 and the second control unit 108 can drive the motor 118 to provide feedback for the single mechanical axis 122.

Control unit 106 and the second control unit 108 each have additional capacity to drive a second motor through connection 112 and connection 116 respectively. This capacity is not used in this single axis inceptor system 100 as only one motor is needed to provide force feedback in a single axis. Further there may be disused voltage inputs (not shown) in each control unit 106, 108 that adds to the inefficiency of the configuration. The unnecessary circuitry and disused processing capacity causes power inefficiency and unnecessary weight. Power and weight are critical concerns for vehicle and other control systems where active inceptors are used. In addition, there is a second active inceptor 128 of the same configuration where the inefficiencies may be replicated.

SUMMARY

According to an aspect of the invention there is provided a control unit in an active inceptor configurable to generate force feedback in a linked active inceptor system, comprising: a first connection configured when an operation is performed to drive a motor and in response thereto the motor to generate an associated force feedback at the active inceptor; and a second connection configured when the operation is performed to drive a remote motor in a remote active inceptor and in response thereto the remote motor to generate the associated feedback at the remote active inceptor.

In an aspect the active inceptor and the remote active inceptor are single axis active inceptors.

In an aspect there is a bus connection between the active inceptor and the remote active inceptor.

In an aspect the control unit sends a change of control message from the control unit to the remote control unit.

In an aspect the control unit sends the change of control message to the remote control unit in response to a detected failure in the control unit.

In an aspect on sending the change of control message the control unit relinquishes control of the linked single axis inceptor system to the remote control unit.

In an aspect relinquishing control further comprises the control unit being configured to allow the remote control unit to drive at least one of the motor and the remote motor.

In an aspect in response to the detected failure the control unit attempts to reset.

In an aspect in response to a successful reset the control unit switches to a passive role in the linked single axis inceptor system, the passive role comprising: monitoring for change of control messages from the remote control unit; and receiving force feedback from the remote active inceptor.

In an aspect if no failure is detected by the control unit, the control unit continues to drive at least one of the motor and the remote motor.

In an aspect there is a discrete link connection between the control unit of the active inceptor and the remote control unit of the remote active inceptor.

In an aspect the bus connection and the discrete link are configured: to allow the control unit to receive the change of control message from the remote control unit; and to allow the control unit to send the change of control message to the remote control unit.

In an aspect the bus connection is a Control Area Network Bus connection.

In an aspect a first plurality of sensor data associated with the active inceptor and a second plurality of sensor data associated with the remote active inceptor are received.

In an aspect there is a first redundant processor channel; and a second redundant processor channel.

In an aspect there is a DC voltage source to controllably drive the motor and the remote motor independently.

In an aspect an active inceptor is provided comprising: a motor; a control unit; the motor configured to be driven by a remote active inceptor; and a bus connection and a discrete link configured when connected to allow the control unit to communicate with the remote active inceptor.

In an aspect the active inceptor system comprises at least a first redundant motor winding and a second redundant motor winding; the control unit configured to drive the motor associated with the first redundant motor winding; and the second redundant motor winding configured to be driven by the remote active inceptor.

In an aspect, there is one or more sensors, the one or more sensors comprising at least one of: one or more temperature sensors communicating one or more temperature values to the control unit and to the remote active inceptor; one or more motor resolvers communicating one or more resolution values of the motor to the control unit and to the remote active inceptor; and one or more force transducers collecting one or more force values from the operation to the control unit and to the remote active inceptor.

In an aspect a linked active inceptor system is provided comprising: an active inceptor; a second active inceptor; a first connection of the active inceptor being connected to the second motor of the second active inceptor; a second connection of the second active inceptor being connected to a motor of the active inceptor; a bus connection of the active inceptor being connected to a bus connection of the second active inceptor; and a discrete link connecting the active inceptor and the second active inceptor.

In an aspect, the active inceptor and the second active inceptor are linked controls in a twin piloted vehicle.

In an aspect, the linked controls in the twin piloted vehicle are one of helicopter yaw pedals and helicopter collective levers.

In an aspect, a method for controlling force feedback in a linked active inceptor system is provided comprising: driving, by a control unit in an active inceptor, at least one of a motor in the active inceptor and a second motor in a second active inceptor, and in response thereto the motor generating an associated force feedback at the active inceptor and/or the second motor generating an associated force feedback at the second active inceptor.

In an aspect the second control unit is monitoring for a change of control message from the control unit; the control unit detecting a failure in the control unit; and in response to detecting the failure, the control unit relinquishing control and sending a change of control message to the second control unit, the second control unit taking over driving the least one of the motor and the second motor from the control unit.

In an aspect in response to detecting the failure in the control unit, the control unit resetting; and in response to a successful reset the control unit monitoring for the change of control message from the second control unit.

BRIEF DESCRIPTION OF THE FIGURES

The invention will now be described by way of example only with reference to the figures, in which.

DETAILED DESCRIPTION

The present invention relates to a combination of active inceptors which each act as a redundancy for another so that one active inceptor is configured to control and monitor a second active inceptor and vice versa. This means that there is no need for individual redundancy in each active inceptor which brings several advantages. The invention reduces complexity in active inceptors which allows for increased reliability. The invention also features lower overall component weight and power consumption which are key issues in many control systems. In addition, the system ensures the necessary level of security to deal with failure of any component in the active inceptor which is in control and allowing another active inceptor taking control with a minimal delay.

Figure 2:
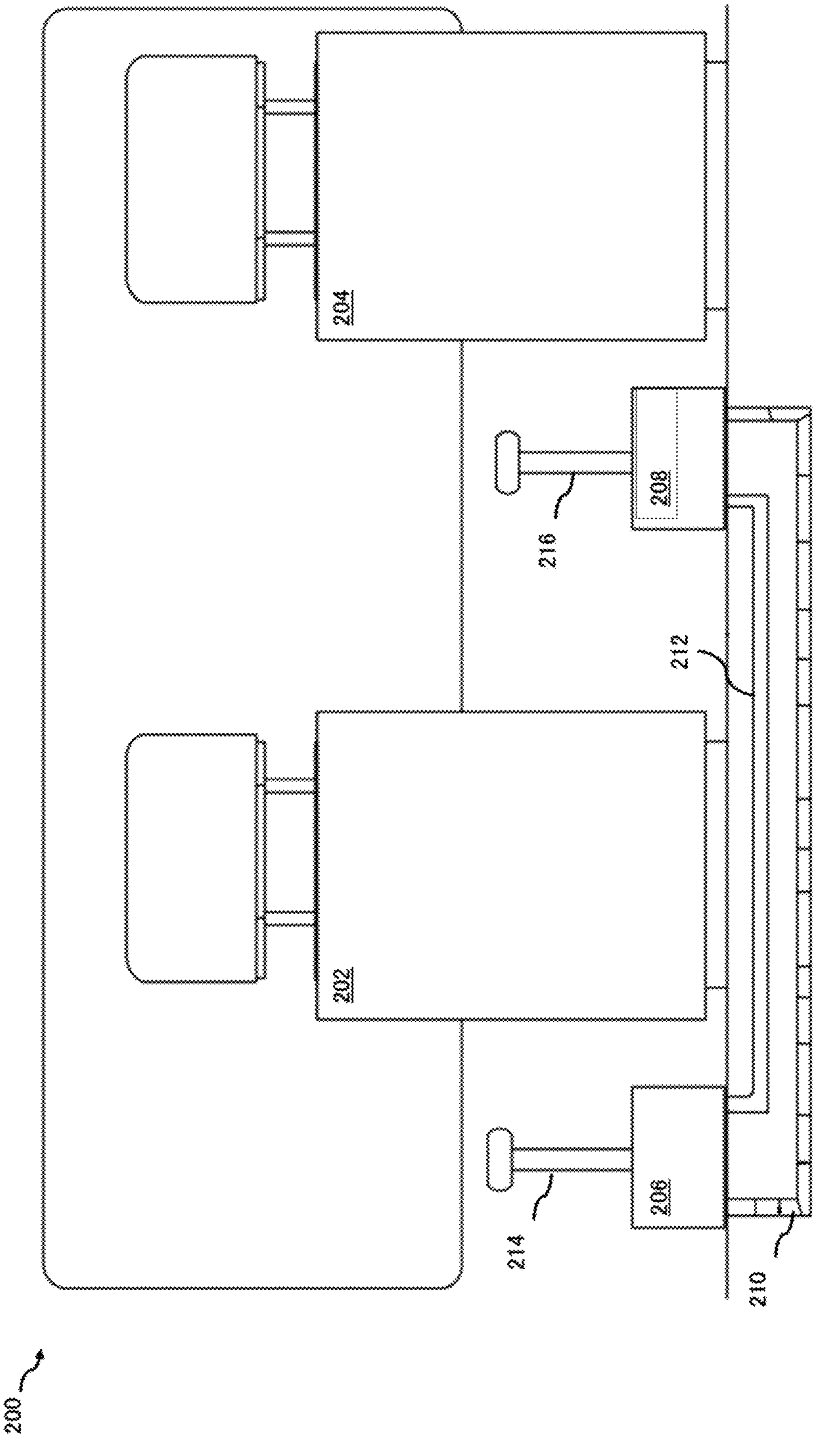
FIG. 2 is a rear view that illustrates a linked single axis inceptor system in a twin piloted vehicle cockpit, according to the present invention.

FIG. 2 shows a rear view of a linked single axis inceptor system 200 implemented in a twin piloted vehicle with linked controls. The linked controls are one of helicopter collective levers, yaw pedals or other known single axis controls. The linked single axis inceptor system 200 comprises a single axis inceptor 206 located to the right of a seat 202, a remote single axis inceptor 208 located to the right of seat 204, electrical connections 210, and a bus connection 212. Each inceptor includes a hand control 214, 216 which is in use by an operator. The single axis inceptors 206, 208 transfer operations applied to the hand grips 214, 216 to a control mechanism of the vehicle. They also provide force feedback out to the hand grips 214, 216 as tactile information or warnings about the control mechanism. This may include replicating operator inputs at the linked active inceptor.

In an initial configuration the single axis inceptor 206 may be in an active mode controlling the force feedback throughout the linked single axis inceptor system 200. This includes controlling the force feedback at the first hand grip 214 at the single axis inceptor 206 and the remote hand grip 216 at the remote single axis inceptor 208. In an example, when a first operator performs an operation at the first hand grip 214 the single axis inceptor 206 controls the force feedback at the remote hand grip 216 based on the operation.

Alternatively, when a second operator provides the operation at the remote hand grip 216 the single axis inceptor 206 controls and generates force feedback at the hand grip 214 based on the operation. The level of force feedback provided may be based on sensor data associated with the operation or other data.

Active inceptors are commonly installed in critical control systems with high reliability requirements. These requirements can include the ability to cope with component and/or software failure during operation. To provide redundancy the remote single axis inceptor 208 can take over control of providing force feedback in the linked single axis inceptor system 200, from the single axis active inceptor 206. The take over may be triggered when a failure is detected in a control unit in the single axis inceptor 206 which then immediately relinquishes control. On detecting that the single axis inceptor 206 has relinquished control, the remote single axis inceptor 208 immediately takes over control of providing force feedback in the linked single axis inceptor system 200. A change of control message may be sent from the single axis inceptor 206 to the remote single axis inceptor on failure to communicate a takeover is required. After the failure is detected the remote single axis inceptor 208 sends an indication of failure to the first single axis incept. In response the single axis inceptor 206 relinquishes control of the force feedback to the remote single axis inceptor 208 and may be reset. Meanwhile the remote single axis inceptor 208 switches into the active mode and provides any required force feedback in the hand grips 214, 216. The takeover occurs rapidly such as within 10 ms of the detected failure in the single axis inceptor 206 to ensure no lengthy loss of functionality. This transfer of control is explained in more detail in later figures.

In addition, at any one time an active control device is known, and it is this control device which is operating the vehicle. This is important to ensure there is no time when the system does not know from which controller the active control is coming.

Figure 3:
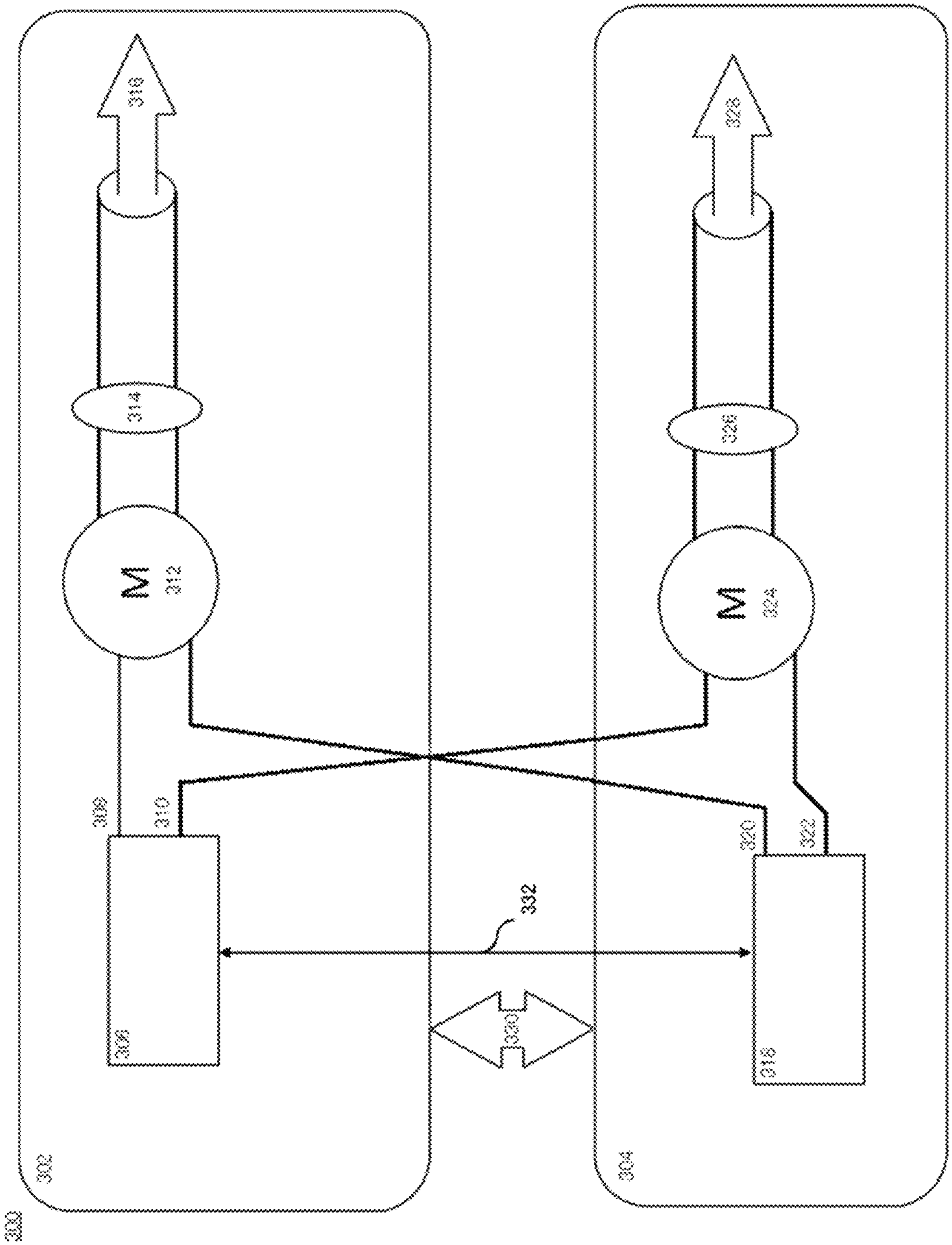
FIG. 3 is a schematic diagram of an example linked single axis inceptor system, according to the present invention.

FIG. 3 is a schematic diagram of an example linked single axis inceptor system 300, according to the present invention. The system comprises a single axis inceptor 302 and a remote single axis inceptor 304. An external bus connection 330 may be configured to allow the sending and receiving of messages and/or other data between the single axis inceptor 302 and the remote single axis inceptor 304. A discrete link 332 connects the control unit 306 and remote control unit 318 directly to provide reliability and redundancy for the bus connection 330.

The single axis inceptor 302 comprises a control unit 306 configured to drive a motor 312 through a first connection 308. A first external connection 310 configured to allow the control unit 306 to also drive a remote motor 324 in the remote single axis inceptor 304. A first gearing system 314 transfers motor force from the motor 312 into force feedback in a first mechanical axis 316. A second external connection 320 is connected at the motor 312 to allow the motor 312 to be driven by the remote single axis inceptor 304.

The remote single axis inceptor 304 comprises a remote control unit 318 configured to drive the remote motor 324 through second connection 322. The second external connection 320 is configured to allow the remote control unit 318 to drive the motor 312 in the single axis inceptor 302. A remote gearing system 326 is configured to transfer motor force from the remote motor 324 in a second mechanical axis 328. The first external connection 310 is configured to allow the remote motor 324 to be driven the single axis inceptor 302.

The control unit 306 and remote control unit 318 may be functionally equivalent. They each have the capability to drive the motor 312 and/or the remote motor 324. In an initial configuration the control unit 306 is configured to drive the motor 312 through the first connection 308 and drive the remote motor 324 through the first external connection 310. The motors are driven to generate the associated force feedback at the single axis inceptor 302 and remote single axis inceptor 304. The force feedback may be determined based on operations at either single axis inceptor.

To drive the motors and generate feedback the control units each, have the capability to transmit power to the motor 312 and the remote motor 324 through the connections 308, 310, 320, 322. To supply power to both motors the control unit 306 and the remote control unit 318 may also comprise a DC voltage source. The DC voltage source in each control unit controllably supplying power to two motors independently associated with the determined force feedback.

The force feedback provided at the first mechanical axis 316 and the second mechanical axis 328 may provide tactile information based on an operation at either the single axis inceptor 302 or the remote single axis inceptor 304. As discussed above only one of the control unit 306 and the remote control unit 318 is in control of the single axis inceptor system at one time. To prepare the force feedback, a first plurality of sensor data may be collected from the single axis inceptor 302 and a second plurality of sensor data from the remote single axis inceptor 304. The sensor data being collected from one or more sensors associated with the active inceptors. The first plurality of sensor data and the second plurality of sensor data may be communicated to the control unit 306 and the remote control unit 318 to determine an operating response of the linked single axis inceptor system. The operating responses can then be used to determine the feedback and monitor for failures in the control units. More detail on the sensors inside the single axis inceptors is provided in later sections.

As discussed, active inceptors have high reliability requirements and providing redundancy can help to meet these requirements. During operation the control unit 306 monitors the remote control unit 318 for failure and correspondingly the remote unit 318 monitors the control unit 306 for failure. The control unit 306 may initially be in the active role and drive both the motor 312 and the remote motor 324 to provide the required force feedback. In this case the remote control unit 318 plays a passive or hot-standby role monitoring the operating response of the control unit 306 for potential failure without driving the motors and providing force feedback. In this role, when failure occurs in the control unit 306 the remote control unit 318 is ready to take over driving the motor 312 and the remote motor 324. The remote control unit 318 has the capacity to drive the motor 312 through the second external connection 320 and the remote motor through the second connection 322.

The motor 312 and the remote motor 324 are configured to be driven by either the control unit 306 or the remote control unit 318. To achieve this, the motor 312 and the remote motor 324 may comprise one or more redundant motor windings. The control unit 306 may be connected to a first redundant winding of the motor 312 through connection 308 and a first redundant winding of the remote motor 324 through external connection 310. While the remote control unit 318 may be connected to a second redundant winding of the motor 312 through the connection 320 and a second redundant winding of the remote motor 324 through the second connection 322. Alternatively, a controllable switch or other method known to the skilled person can be used to selectively receive a power input at the motor 312 and the remote motor 324. With the above configurations the remote control unit 318 can take over driving the motor 312 and/or the remote motor 324 in the event of a failure in the control unit 306. The motor windings of the motors 312, 324 are configured such that in the event of a failure in one motor winding a second can still be powered to drive the motor and thus control the force feedback.

To monitor for failure in the control unit 306, there is continuous communication of messages to and from the control unit 306 and the remote control unit 318 through the bus connection 330. The messages communicating which control unit is currently in control and whether one of the control units is relinquishing control. Sensor data and other data can also be communicated through the bus connection 330 to crosscheck the detected failure. The bus connection 330 being a Control Area Network Bus "CANBus" connection or one of other bus connection architectures known to the skilled person. The messages and sensor data are also passed between the single axis inceptor 302 and the remote single axis inceptor 304 through the discrete link 332 to provide redundancy for the bus connection 330.

When the control unit 306 is in control, the remote control unit 318 receives a message from the control unit 306 through the bus connection 330 communicating that the control unit 306 is controlling the force feedback for the single axis inceptor system 300. Control unit 306 can detect failures in its operation and relinquishes control of the force feedback immediately on detection of the failure. As part of relinquishing control, the control unit 306 sends a change of control message to the remote control unit 318. The change of control message informing the remote control unit 318 that the control unit 306 is no longer controlling the force feedback and that the remote control unit 318 must take over. The change of control message is sent from the control unit 306 to the remote control unit 318 through both the bus connection 330 and discrete link 332 for redundancy. The control unit 306 relinquishes control of the force feedback by no longer driving the motor 312 or the remote motor 324 thus allowing the remote control unit 318 to drive the motors. While no indication of failure is determined at the control unit 306 it continues in the active role in the linked single axis inceptor system 300. After failing and relinquishing control, the control unit 306 may optionally be reset to attempt to address the failure.

In response to the failure and receiving of the change of control message, the remote control unit 318 takes on the active role in the linked single axis inceptor system 300. In the active role the remote control unit 318 begins providing any required force feedback at both the single axis inceptor 302 and the remote single axis inceptor 304 by driving the motor 312 and the remote motor 324. After taking control, the remote control unit 318 sends a message to the control unit 306 indicating it is now controlling the force feedback for the single axis inceptor system 300. If successfully reset the control unit 306 switches to the passive or hot-standby role in the linked single axis inceptor system 300. As with the remote control unit 318, the passive role comprises continuously preparing the operating response and monitoring for change of control messages from the remote control unit 318 relinquishing control of the force feedback at the single axis inceptor system 300.

Figure 1:
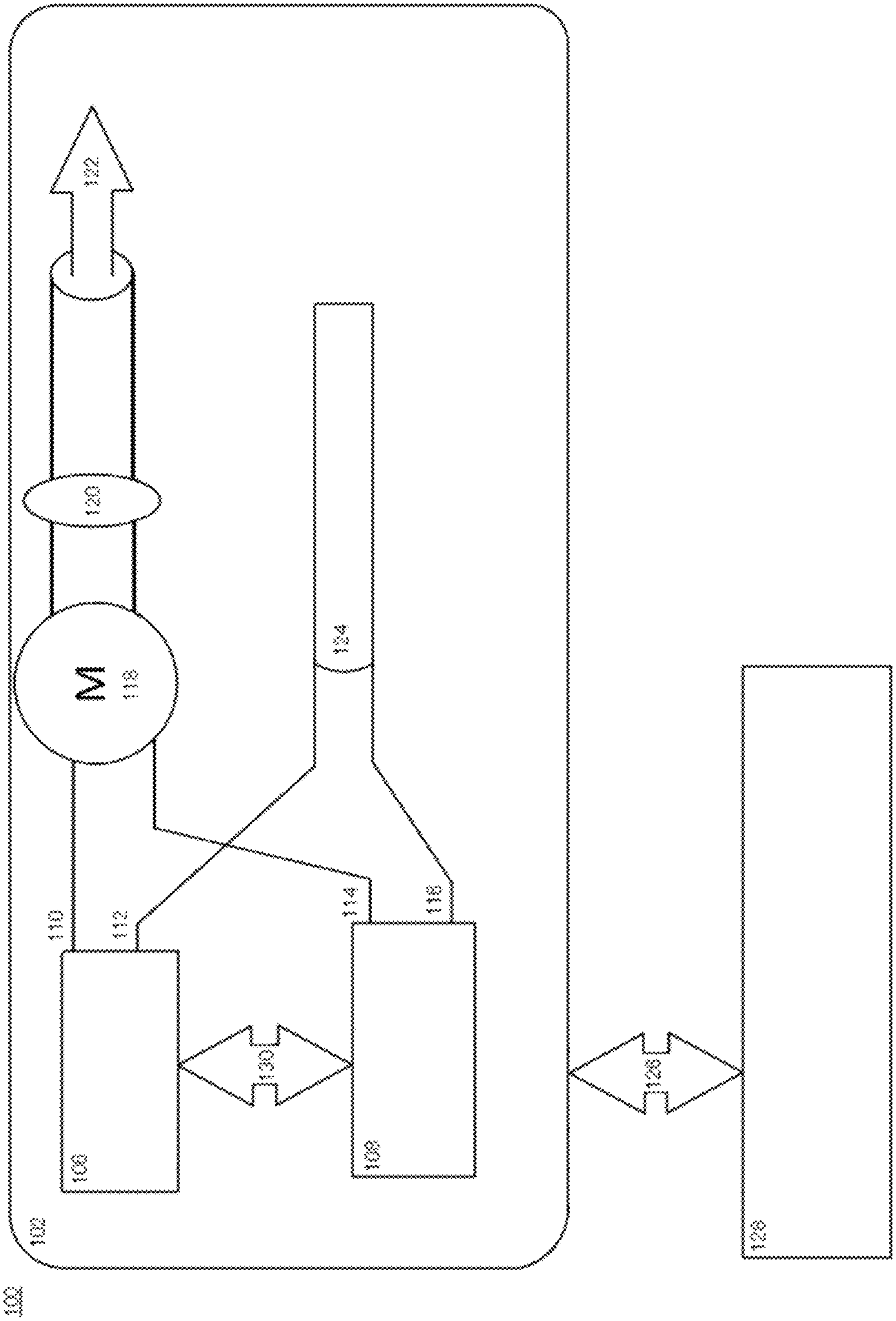
FIG. 1 is a schematic diagram that illustrates a known linked single axis inceptor system.

Both the control unit 306 and the remote control unit 318 continuously determine the operating response for the linked single axis inceptor system 300 based on any user operations that occur or other factors such as sensor data or signals from a flight computer. Preparing the operating response allows the passive control unit to rapidly takeover in the event of failures. For example, take over may occur within 10 ms of failure detection. The single axis inceptor system of FIG. 3 therefore provides the required control unit redundancy while also providing reduced weight and power draw and increased efficiency compared to the known architecture of FIG. 1. The improvements in weight and power draw stemming from the linked single axis inceptor system 300 needing fewer control units and internal connections. The improved efficiency being the result of the reduction in wasted control capability as the control unit 306 and remote control unit 318 are used closer to capacity.

Figure 4:
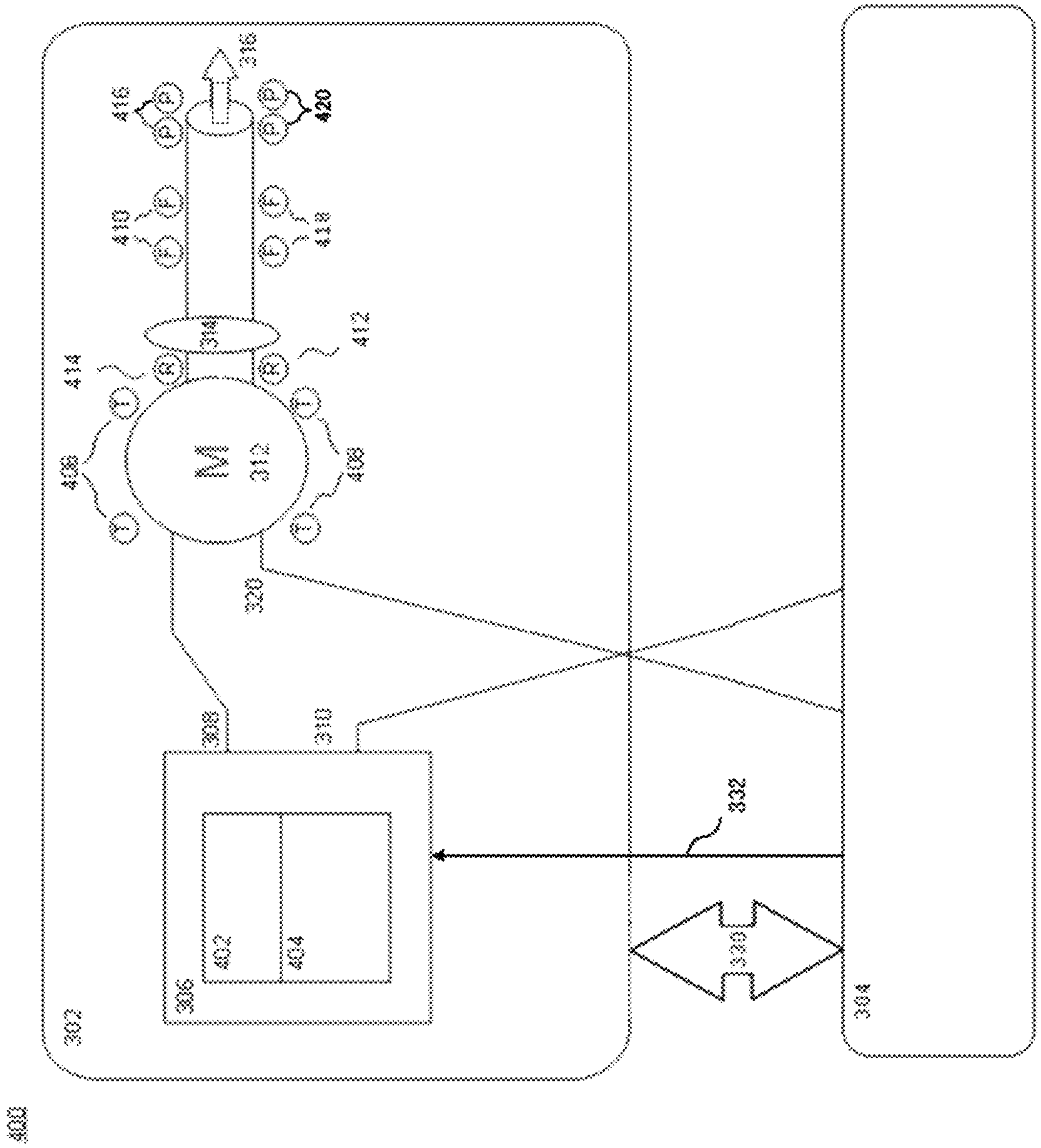
FIG. 4 is a schematic diagram of an example single axis inceptor, according to the present invention.

FIG. 4 is a detailed schematic diagram of an example single axis inceptor 302, according to the present invention. The first single-axis active inceptor 302 additionally includes a first redundant processing channel 402 and a second redundant processing channel 404 in the control unit 306. A first pair of temperature sensors 406 and a second pair of temperature sensors 408. A first motor resolver 414 and a second motor resolver 412. A first pair of force transducers 410 and a second pair of force transducers 418 and a first pair of position sensors 416 and a second pair of position sensors 420.

In the control unit 306 the first processor channel 402 and second processor channel 404 provide redundancy within the control unit 306. In an initial operation the first processing channel 402 may be in control and determines the operating response of the control unit 306. The second processing channel 404 may continuously monitor the operating response for potential failure. In response to the failure in the first processing channel 402 or the second processing channel 404 the control unit 306 will relinquish control of the single axis inceptor system 300 and send the change of control message to the remote control unit 318. This configuration provides an extra layer of redundancy for the linked single axis inceptor system 400 in addition to that between the control unit 306 and remote control unit 318 discussed above. The first processing channel 402 and second processing channel 404 may comprise dissimilar hardware and implement dissimilar software to further improve reliability.

As discussed, the external connection 310 and the external connection 320 are used to transfer power between the single active inceptor 302 and the remote active inceptor 304 to drive the motors. They may also carry sensor data between the single axis inceptor 302 and the remote single axis inceptor 304. The sensor data may be used to determine the operating response for the linked single axis inceptor system 400 at both the single axis inceptor 302 and the remote single axis inceptor 304 and to cross check detected failures.

The first temperature sensor pair 406 collects temperature data from the motor 312. The control unit 306 can use this temperature data to detect overheating or other temperature thresholds in the motor 312. The first temperature pair may be positioned to collect temperature data in the first redundant winding of the motor 312. Notable temperature data may indicate overheating in the motor 312 resulting from a mechanical or electrical failure of the motor, environmental factors, or other issues. The temperature sensor allows for detection of failure in the windings of the motors. Such a failure in the motor winding associated with either control unit will cause that control unit to detect a failure and thus relinquish control. The second temperature sensor pair 408 may perform the same function as the first pair of temperature sensors 406 but communicate the sensor data to the remote single axis inceptor 304.

The first motor resolver 414 and the second motor resolver 412 collect motor resolution data for the motor 312. The first motor resolver communicates the motor position data to control unit 306. The second motor resolver 412 communicates the motor position data to the remote single axis inceptor 304 through the second external connection 320. Motor resolution data guides the commutation of motors for applying phase power with the correct timings. The motor position data may be used in combination with other sensor data by the control unit 306 to determine the operating response of the for the linked single axis control system 400 at the control unit 306 and the remote control unit 318.

As discussed, operations applied at either inceptor in the linked single axis inceptor system 400 may be used to determine the force feedback applied at the single axis inceptor system 300. To determine in part the force feedback required, force data from user operations is collected. The first pair of force transducers 410 and the second pair of force transducers 418 may collect force data from an operation input applied to the single axis inceptor 302. The first force transducer pair 410 communicates the force data to the control unit 306. The second force transducer pair 418 communicates the force data to the remote control unit 318 through the external connection 320. The control unit 306 and the remote control unit 318 may use the force data to in part determine the operating response of the linked single axis inceptor system, and therein generate force feedback.

The position sensors 416, 420 provide an independent source of position data for the single axis active inceptor 302. In addition to the motor resolvers the position sensors provide reliability and redundancy for the position data. They are particularly important when the first gearing system 314 includes an optional clutch. When the clutch is engaged the hand grip 214 of the single axis inceptor 302 is disconnected from the motor 312. The position of the hand grip 214 therefore cannot then be determined without additional position sensing. The first pair of position sensors 416 may communicate position data collected for the single axis inceptor 302 to the control unit 306. Whereas the second pair of position sensors 420 may communicate the position data from the same source to the remote control unit 318.

It will be appreciated that the single axis inceptor shown in FIG. 4 has the equivalent remote single axis inceptor 304 not shown in detail but with the same configuration of additional components as the single axis inceptor 302.

While example numbers are shown in FIG. 4 for each type of sensor, it will be appreciated that any number of each type of sensor may be included. When multiple sensors are provided, each processing channel of each control unit may have a dedicated sensor for redundancy.

Figure 5:
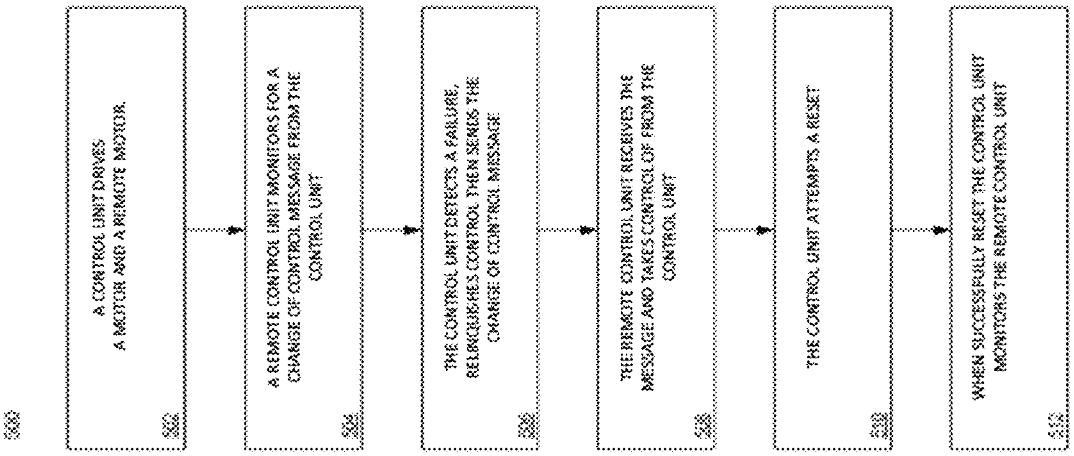
FIG. 5 is a flow chart of an example method of controlling force feedback in a linked single axis inceptor system, according to the present invention.

FIG. 5 illustrates a method of controlling force feedback in a linked single axis inceptor system. At 502, a control unit in an active inceptor drives a motor in the active inceptor. The motor is driven such that when an operation occurs at the linked single axis inceptor system the motor can provide force feedback at the first active inceptor. The feedback may also be determined based on sensor data or other data such as signals from a flight computer. The control unit also drives a remote motor in a remote single axis inceptor to provide the force feedback at the remote single axis inceptor when required. The force feedback provided is determined based on an operational response for the linked single axis inceptor system as generated by the control unit. In an initial state, the control unit periodically messages the remote control unit in the remote single axis inceptor. The messages communicating that the control unit is currently in control of the single axis inceptor system, and thus providing the force feedback.

At 504, the remote control unit monitors the messages from the control unit. The messages may be received by the remote control unit through a bus connection between the active inceptor and the remote active inceptor and a discrete link between the control units to provide redundancy. Even while not actively controlling the feedback, the remote control unit independently determines the operating response of the linked single axis inceptor system. In this way the remote control unit is ready to control the force feedback when required. The remote control unit determines the operating response from the same sensor data or other information as the control unit. Where the same sensor data is used it may be received from separate sensors to provide redundancy.

At 506, a failure is detected by the control unit. This failure may be determined by comparing the operating response for the linked single axis inceptor system determined by the two processing channels within the control unit. In some cases where there is a difference between the two operating responses a failure has occurred in the control unit. The failure may also be triggered or verified by the control unit from sensor data or other data. For example, a failure in a motor winding in the motor associated with the control unit would also cause a failure at the control unit. In response to the detected failure the control unit immediately relinquishes control of the single axis inceptor system, including driving the motor and remote motor, and thus no longer provides force feedback. The control unit also sends a change of control message to the remote control unit. The change of control message communicating to the remote control unit that the control unit is relinquishing control of the single axis inceptor system.

At 508, in response to receiving the change of control message at the remote control unit, the remote control unit takes over driving the motor and the remote motor. This in turn means the remote control unit now provides the force feedback for the linked single axis inceptor system. This is accomplished by the remote control unit now driving the motor of the single axis inceptor and remote motor of the remote single axis inceptor, previously carried out by the control unit. The takeover occurs rapidly because the operating response was being continuously determined by the remote control unit already leading up to receiving of the change of control message. The remote control unit providing the force feedback in the linked single axis inceptor system typically within 10 ms of the detected failure in the control unit.

At 510, a reset of the control unit may be attempted to attempt to recover from the failure. The skilled person will be aware of other techniques to recover a failed control unit for different failure types.

At 512, if the reset of the control unit is successful the control unit can switch roles to a passive or hot-standby mode. The role previously performed by the remote control unit. This means the control unit does not drive the motor or the remote motor. The control unit monitors for messages from the remote control unit in the same way as done previously by the remote control unit. In this passive role the control unit continuously determines the operating response based on the same sensor or other data as the remote control unit. The control unit is now ready to take over in the event of a change of control message from the remote control unit, which is now actively controlling the force feedback in the linked single axis inceptor system.

The example systems of FIGS. 2-4 and method of FIG. 5 describes an initial operation in which the control unit is driving a motor at both active inceptors to provide the force feedback. In an alternative aspect an initial operation comprises the control unit and remote control unit each driving a single motor within their own active inceptor. In such a set up a failure would cause the failing control unit to relinquish control of the motor it drives and send a change of control message to the other control unit accordingly.

In an alternative aspect to the systems of FIGS. 2-4 and the method of FIG. 5 information may be provided as force feedback that originated from an external source to the single axis active inceptor. Such sources may be a flight computer, remote networked computer, or other source. Such signals are provided at the operator in both hand grips 214, 216 of the active inceptors as stick resistance, soft stops, and other operational cues.

While the above aspects are described in the context of vehicle control mechanisms and more specifically as aircraft control mechanisms the skilled person will be aware that the systems and methods described can be applied to other control systems.

In an alternative aspect to that described in FIG. 2, the active inceptors can be organised in a fore and aft position rather than side by side. In a further alternative there may be two active inceptors at a same seat and controlled by a single operator. This is particularly useful if an electronic control and an actuator for the system are in a separate locations.

The sensors described in FIG. 4 are merely examples of sensors that may be included in the system as claimed. The skilled person will be aware that other sensor types and numbers may be required or more relevant to different control systems.

The method described with relation to FIG. 5 may be stored as instructions on a machine-readable medium. That when executed cause a processing means to perform the method of FIG. 5.

The invention claimed is:

1. A control unit in an active inceptor configurable to generate force feedback in a linked active inceptor system, the control unit comprising:

a first connection configured to, responsive to an operation being performed, drive a motor, thereby causing the motor to generate an associated force feedback at the active inceptor; and a second connection configured to, responsive to the operation being performed, drive a remote motor in a remote active inceptor, thereby causing the remote motor to generate the associated feedback at the remote active inceptor, wherein the control unit is configured to send a change of control message to a remote control unit of the remote active inceptor.

2. The control unit according to claim 1, wherein the active inceptor and the remote active inceptor are single axis active inceptors.

3. A system comprising:

the control unit according to claim 1;

the active inceptor;

the remote active inceptor; and a bus connection between the active inceptor and the remote active inceptor.

4. The system according to claim 3, comprising:

a discrete link connection between the control unit of the active inceptor and a remote control unit of the remote active inceptor.

5. The system according to claim 4, wherein the bus connection and the discrete link are configured:

to allow the control unit to receive a change of control message from the remote control unit; and to allow the control unit to send a change of control message to the remote control unit.

6. The system according to claim 3, wherein the bus connection is a Control Area Network Bus connection.

7. The control unit according to claim 1, wherein the control unit receives a first plurality of sensor data associated with the active inceptor and a second plurality of sensor data associated with the remote active inceptor.

8. The control unit according to claim 1, further comprising:

a first redundant processor channel; and a second redundant processor channel.

9. A system comprising the control unit according to claim 1, further comprising a DC voltage source to controllably drive the motor and the remote motor independently.

10. An active inceptor comprising:

the control unit according to claim 1;

the motor; and a bus connection and a discrete link configured to allow the control unit to communicate with the remote active inceptor;

wherein the motor is configured to be driven by the remote active inceptor.

11. The active inceptor according to claim 10, wherein:

the motor comprises at least a first redundant motor winding and a second redundant motor winding;

the control unit is configured to drive the motor associated with the first redundant motor winding; and the second redundant motor winding is configured to be driven by the remote active inceptor.

12. The active inceptor according to claim 10, further comprising one or more sensors, the one or more sensors comprising:

one or more temperature sensors configured to communicate one or more temperature values to the control unit and to the remote active inceptor; and/or one or more motor resolvers configured to communicate one or more resolution values of the motor to the control unit and to the remote active inceptor; and/or one or more force transducers configured to collect one or more force values from the operation to the control unit and to the remote active inceptor.

13. The control unit according to claim 1, wherein the control unit is configured to send the change of control message to the remote control unit in response to a detected failure in the control unit.

14. The control unit of claim 13, wherein on sending the change of control message the control unit is configured to relinquish control of the linked single axis inceptor system to the remote control unit.

15. The control unit according to claim 14, wherein relinquishing control is accomplished at least in part by the control unit being configured to allow the remote control unit to drive the motor, the remote motor, or the motor and the remote motor.

16. The control unit according to claim 13, wherein in response to the detected failure the control unit is configured to reset.

17. The control unit according to claim 16, wherein in response to a successful reset, the control unit is configured to switch to a passive role in the linked single axis inceptor system, the passive role comprising:

monitoring for change of control messages from the remote control unit; and receiving force feedback from the remote active inceptor.

18. The control unit according to claim 13, wherein if no failure is detected by the control unit, the control unit is configured to continue driving the motor, the remote motor, or the motor and the remote motor.

19. A linked active inceptor system comprising:

a first active inceptor;

a second active inceptor;

a first connection of the first active inceptor being connected to a second motor of the second active inceptor;

a second connection of the second active inceptor being connected to a first motor of the first active inceptor;

a bus connection of the first active inceptor being connected to a bus connection of the second active inceptor; and a discrete link connecting the first active inceptor and the second active inceptor.

20. The linked active inceptor system according to claim 19, wherein the first active inceptor and the second active inceptor are linked controls in a twin piloted vehicle.

21. The linked active inceptor system according to claim 20, wherein the linked controls in the twin piloted vehicle are one of helicopter yaw pedals and helicopter collective levers.

22. A method for controlling force feedback in a linked active inceptor system that includes a first active inceptor and a second active inceptor, the method comprising:

driving, by a first control unit in the first active inceptor, at least one of a first motor in the first active inceptor and a second motor in the second active inceptor, and in response thereto the first motor generating an associated force feedback at the first active inceptor and/or the second motor generating an associated force feedback at the second active inceptor, wherein the first control unit is configured to send a change of control message to a second control unit in the second active inceptor.

23. The method according to claim 22, further comprising:

monitoring, by the second control unit in the second active inceptor, for a change of control message sent from the first control unit;

wherein the first control unit is configured to detect a failure in the first control unit; and wherein in response to detecting the failure, the first control unit is configured to relinquish control of the linked active inceptor system and send the change of control message to the second control unit, and the second control unit is configured to take over driving the first motor, the second motor, or the first motor and the second motor from the first control unit.

24. The method according to claim 23, further comprising:

in response to detecting the failure in the first control unit, the first control unit is configured to reset; and in response to a successful reset, the first control unit is configured to monitor for a change of control message from the second control unit.

* * * * *